UNITED STATES PATENT OFFICE.

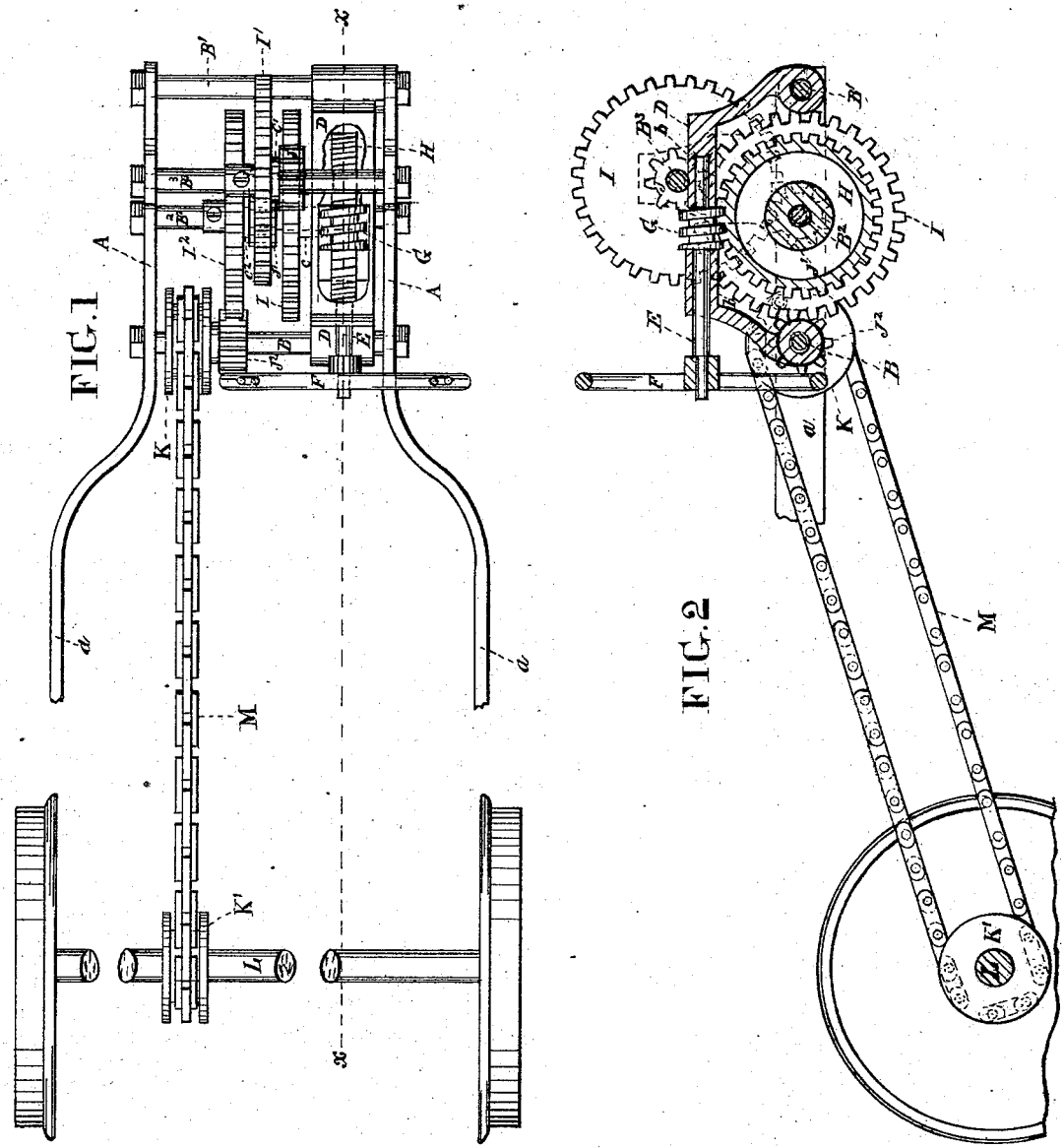

ROBERT STEEL AND SAMUEL AUSTIN, OF PHILADELPHIA, PENNSYLVANIA.

IMPROVEMENT IN MOTORS FOR VEHICLES.

Specification forming part of Letters Patent No. 157,884, dated December 15, 1874; application filed August 21, 1874.

*To all whom it may concern:*

Be it known that we, ROBERT STEEL and SAMUEL AUSTIN, of the city and county of Philadelphia, in the State of Pennsylvania, have invented an Improvement in Hand-Motors for Street-Cars, &c., of which the following is a specification:

Our invention relates to the combination of a worm-wheel on the driving-shaft with a series of teeth-wheels and a chain-wheel, from which motion is imparted by means of a chain to the front axle of a car or other vehicle. Power is applied to the driving-shaft by means of a hand-wheel on one end of the same.

In the accompanying drawings, Figure 1 is a plan view of our improved motor. Fig. 2 is a vertical section at the the line $x\text{-}x$ of Fig. 1.

Like letters of reference in both figures indicate the same parts.

A A are housings, which support a series of stationary shafts, B, $B^1$, $B^2$, and $B^3$. The housings are extended at $a\ a$, and connect with the front end of the car. D is a casting, supported at its ends by the shafts B and $B^1$, as shown more clearly in Fig. 2. The upper part of said casting has bearings $b\ b$, which support the driving-shaft E, which is provided with a hand-wheel, F, and a worm-wheel, G. The worm-wheel gears into the toothed wheel H on the shaft $B^2$, which has a positive connection with the spur-wheel I by means of the joint-hub $c$. The wheel I gears into the pinion J on the shaft $B^3$, to impart motion to the wheel $I^1$, connected by means of the hub $c^1$ with said pinion. The wheel $I^1$ gears into the pinion $J^1$ on the shaft $B^2$, and imparts motion to the wheel $I^2$, connected to the pinion by the hub $c^2$, and the wheel $I^2$ gears into the pinion $J^2$, which has a positive connection with the chain-wheel K on the shaft B, to communicate motion to the front axle L of the car by means of the chain M, which passes over the wheel K and the wheel $K'$ of the axle.

It will be seen that by the use of the worm-wheel G, acting through the intermediate gearing between it and the pinion $J^2$, a high speed may be given to the axle L for the propulsion of the car.

What we claim as our invention is—

The combination of the driving-shaft E, having a worm-wheel, G, the toothed wheel H, the wheels I, $I^1$, and $I^2$, pinions J, $J^1$, and $J^2$, chain-wheels K and $K'$, chain M, and axle L, substantially as and for the purpose above set forth.

ROBERT STEEL.
SAMUEL AUSTIN.

Witnesses:
 THOMAS J. BEWLEY,
 STEPHEN USTICK.